United States Patent
Milhas et al.

(10) Patent No.: US 6,453,941 B1
(45) Date of Patent: Sep. 24, 2002

(54) PIPE TUBULAR ELEMENT COMPRISING A RIGID LONGITUDINAL PORTION AND A FLEXIBLE LONGITUDINAL PART IN ONE SINGLE PIECE

(75) Inventors: Pierre Milhas; Stéphane Jung, both of Vitry-le-Francois (FR)

(73) Assignee: Nobel Plastiques, Nanterre (FR)

( * ) Notice: Subject to any disclaimer, the term of this patent is extended or adjusted under 35 U.S.C. 154(b) by 0 days.

(21) Appl. No.: 09/600,635
(22) PCT Filed: Dec. 15, 1999
(86) PCT No.: PCT/FR99/03140
§ 371 (c)(1),
(2), (4) Date: Jul. 20, 2000
(87) PCT Pub. No.: WO00/36326
PCT Pub. Date: Jun. 22, 2000

(30) Foreign Application Priority Data

Dec. 16, 1998 (FR) .............................. 98 15880

(51) Int. Cl.[7] .................... F16K 15/14; F16L 33/00
(52) U.S. Cl. .................. 137/515; 137/844; 137/846; 285/239; 285/240; 285/331; 285/921
(58) Field of Search ........................... 137/844, 846, 137/515; 285/239, 240, 331, 423, 921

(56) References Cited

U.S. PATENT DOCUMENTS

| | | | | |
|---|---|---|---|---|
| 2,473,441 A | | 6/1949 | Muller | |
| 3,888,523 A | * | 6/1975 | Bartholomew | 285/382 |
| 3,955,594 A | * | 5/1976 | Snow | 137/844 |
| 4,047,739 A | * | 9/1977 | Aitken | 285/21.1 |
| 4,991,882 A | * | 2/1991 | Gahwiler | 285/331 |
| 5,098,405 A | * | 3/1992 | Peterson et al. | 604/247 |
| 5,143,117 A | * | 9/1992 | Klein | 137/512.15 |
| 5,466,017 A | * | 11/1995 | Szabo et al. | 285/319 |
| 5,568,944 A | * | 10/1996 | Kawasaki | 285/21.1 |
| 5,636,875 A | * | 6/1997 | Wasser | 285/21.1 |
| 5,924,452 A | * | 7/1999 | Szpara et al. | 137/846 |

FOREIGN PATENT DOCUMENTS

| | | |
|---|---|---|
| DE | A13606348 | 4/1987 |
| GB | 1354691 | 5/1974 |

* cited by examiner

Primary Examiner—Michael Powell Buiz
Assistant Examiner—Ramesh Krishnamurthy
(74) Attorney, Agent, or Firm—Birch, Stewart, Kolasch Birch, LLP

(57) ABSTRACT

A pipe element possessing a longitudinal axis (2) along which a rigid tubular part (3) and a flexible tubular part (4), together constituting a single piece, extend. The rigid part (3) has one end presenting a substantially radial connection surface (8) for connection to an end portion (11) of the flexible part (4), and an additional connection surface (10) on the radial connection surface (8) connecting to the end portion (11) of the flexible part (4), at least a part of the additional connection surface (10) extending substantially parallel to the longitudinal axis (2).

8 Claims, 4 Drawing Sheets

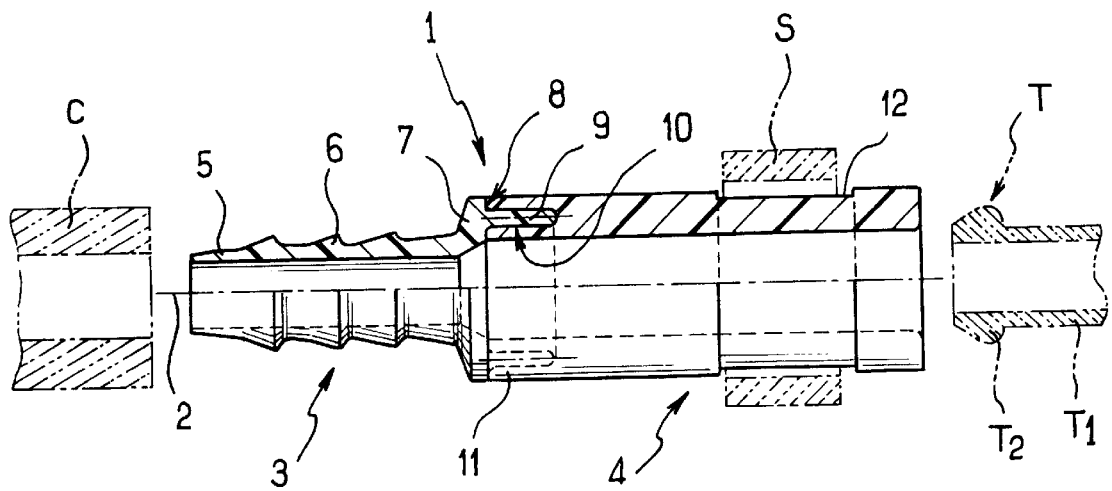
FIG_1
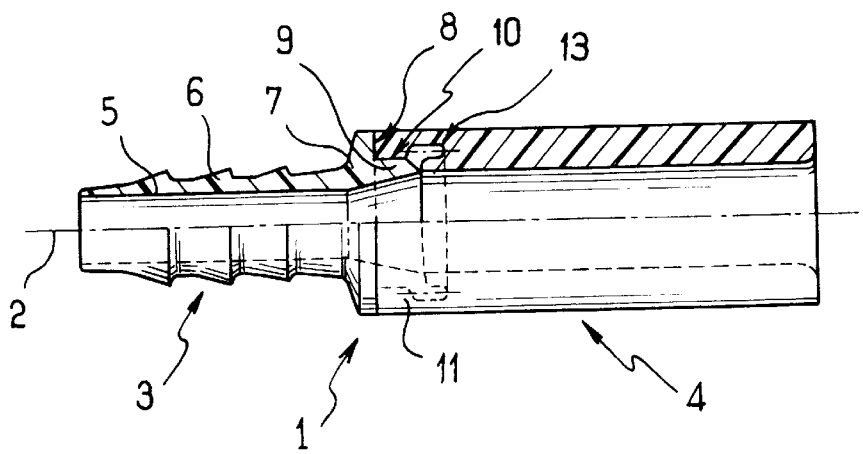
FIG_2

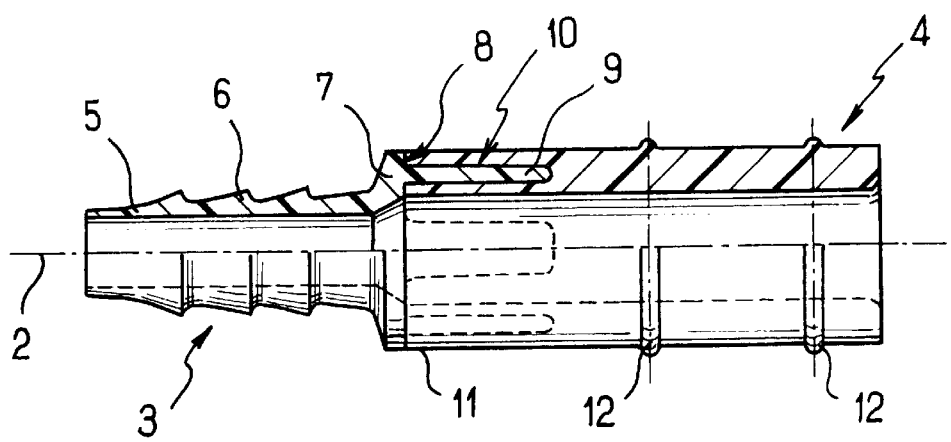
FIG_3
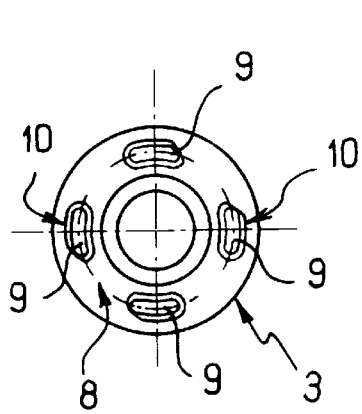
FIG_4
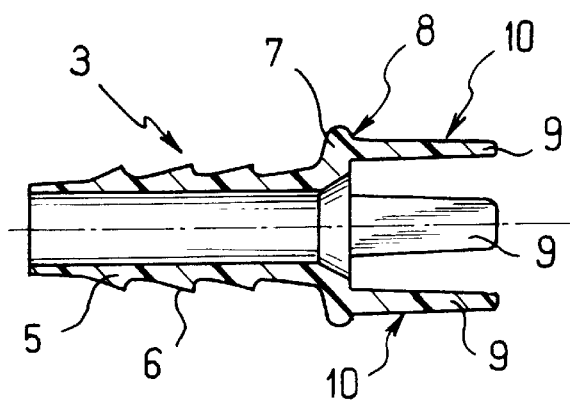
FIG_5

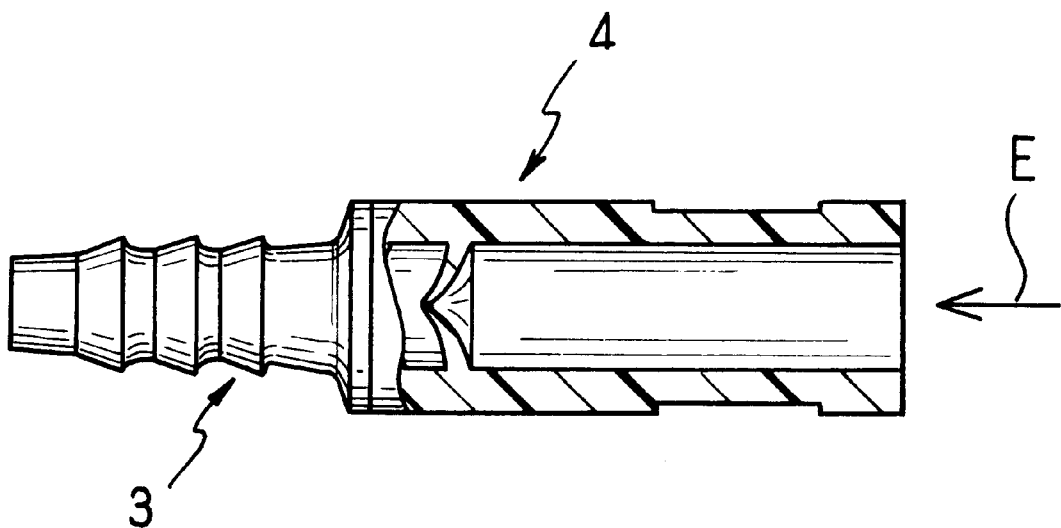
FIG_6
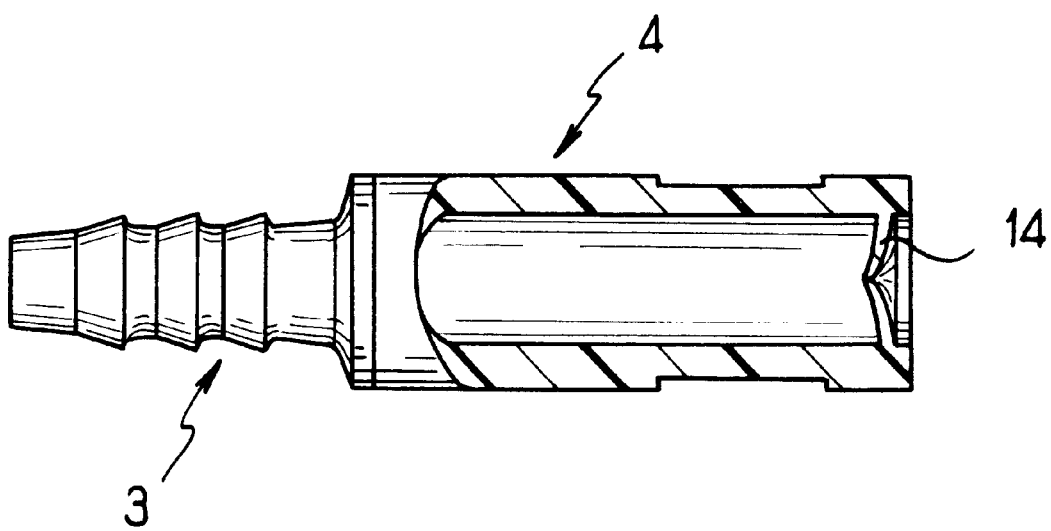
FIG_7

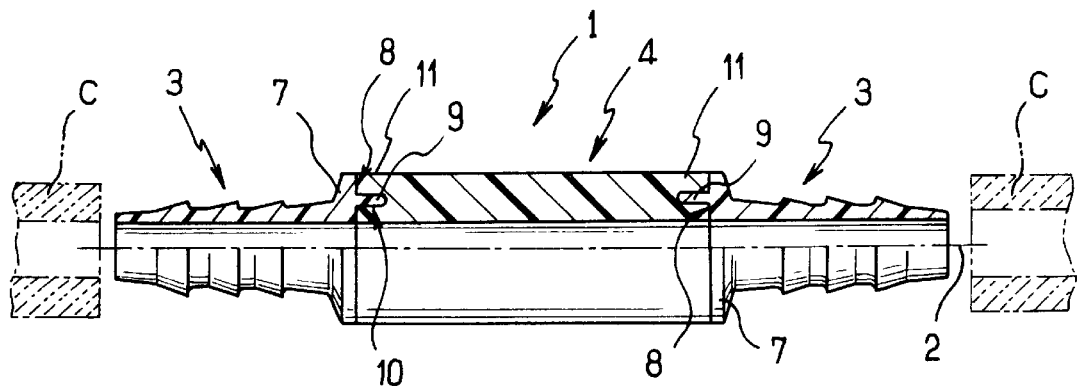
FIG_8
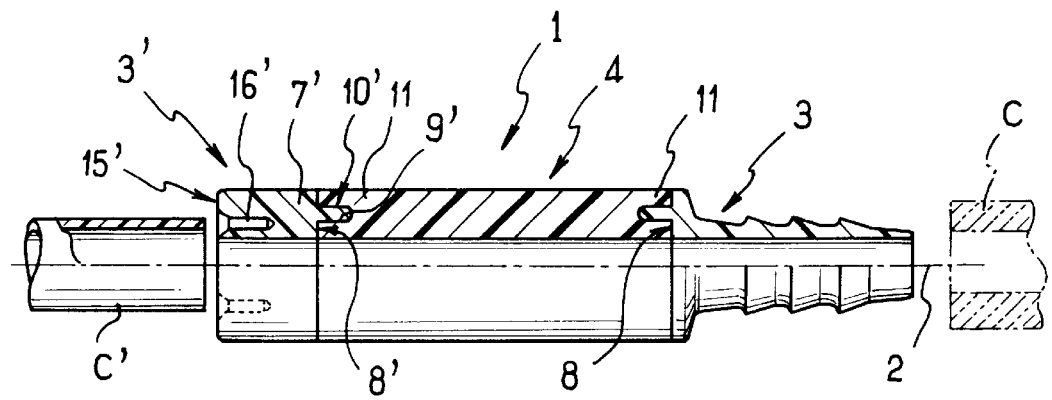
FIG_9
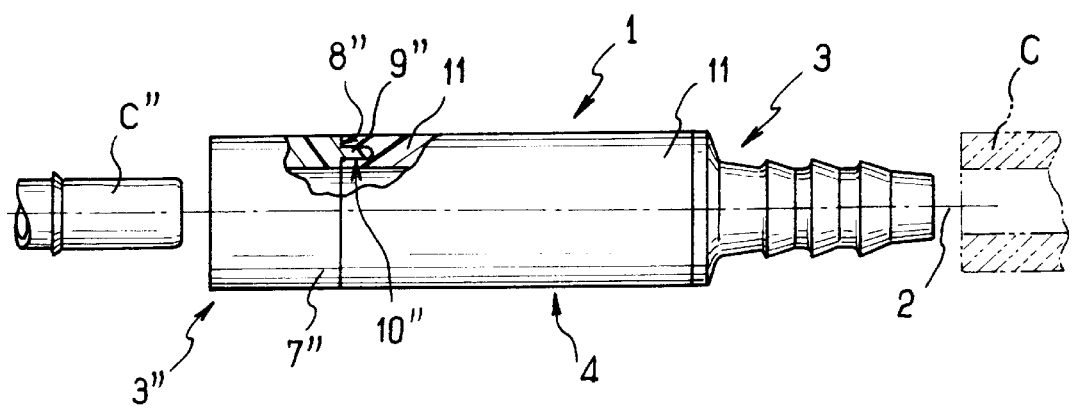
FIG_10

PIPE TUBULAR ELEMENT COMPRISING A RIGID LONGITUDINAL PORTION AND A FLEXIBLE LONGITUDINAL PART IN ONE SINGLE PIECE

This application is the national phase under 35 U.S.C. § 371 of PCT International Application No. PCT/FR99/03140 which has an International filing date of Dec. 15, 1999, which designated the United States of America.

The present invention relates to a tubular pipe element comprising a rigid longitudinal part and a flexible longitudinal part.

BACKGROUND OF THE INVENTION

Such elements are known, for example, that form tubular junction elements between two thermoplastic pipes or between a thermoplastic pipe and a nipple. Such an element is intended, for example, to be installed in the fuel feed circuit of a motor vehicle to connect the nipple of the tank to the pipe which is connected to the system for injecting fuel into the combustion chambers of the engine.

In such an application, the pipe element joining the thermoplastic pipe to the tank nipple must provide a leak-proof junction that withstands being torn apart while nevertheless being relatively flexible to ensure that the vibration forces to which the junction is subjected while the vehicle is in operation do not give rise to leaks or to the junction breaking. In addition, in the motor industry, assembly rates are high and the nipple must therefore be connected to the pipe quickly and without requiring tooling that is difficult to implement.

In order to satisfy these requirements, it is known to interpose a flexible part comprising an elastomer sleeve between the nipple and the pipe. To do this, a rigid part constituted by an endpiece comprising a first male part with serrated tangs and a second male part axially in line therewith and in the form of a nipple is previously mounted on the pipe by inserting the male part having serrated tangs into one end of the pipe. Because of the forces involved, that operation cannot be performed manually and it is implemented by means of tooling dedicated to that purpose. The nipple-shaped male part is then engaged in one end of the flexible sleeve and a metal collar is placed around the flexible sleeve to clamp it onto the nipple-shaped male part. The pipe fitted in this way can then be mounted on a vehicle on an assembly line and can be connected to the nipple of the tank or to some other element of the vehicle. This operation is performed manually by an operator who engages the free end of the flexible sleeve on the tank nipple and then clamps it onto the nipple by means of a clamping collar. The junction made in this way satisfies the above-mentioned requirements in satisfactory manner. However, the structure of that junction is complex and requires a relatively large number of pieces (four pieces: a rigid endpiece; a flexible sleeve; and two clamping collars). This gives rise to expensive assembly operations and complicates stock management. In addition, the minimum length of the junction corresponds substantially to the length of the flexible sleeve, i.e. to the sum of the length of the tank nipple plus the length of the endpiece nipple plus the distance between the tank nipple and the endpiece nipple. This length makes it difficult to install the junction in vehicles where the space available for components is becoming smaller and smaller. In addition, the junction is relatively heavy, which goes against the present trend in the motor industry where manufacturers are seeking to reduce vehicle weight so as to limit fuel consumption.

OBJECTS AND SUMMARY OF THE INVENTION

The invention provides a pipe element possessing a longitudinal axis along which there extend in succession a rigid tubular part and a flexible tubular part constituting a single piece, the rigid part having one end presenting a substantially radial surface for connection to an end portion of the flexible part and, at the radial connection surface, means for defining an additional surface for connection to the end portion of the flexible part, at least a part of the additional connection surface extending substantially parallel to the longitudinal axis.

The means for defining an additional connection surface enable the connection between the rigid part and the flexible part to be reinforced both against pull-off forces parallel to the longitudinal axis and against transverse forces in bending, the ability to withstand these forces being improved in particular by the part of the additional connection surface that extends substantially parallel to the longitudinal axis of the pipe element. The pipe element is also simple in structure, compact, and relatively lightweight. In addition, the pipe element can be made by two-material injection so it is inexpensive.

In a first embodiment of the invention, the means for defining the additional connection surface comprise a ring disposed coaxially about the longitudinal axis of the element and embedded at least in part in the end portion of the flexible part, the ring having a free edge optionally presenting a step projecting radially into the end portion of the flexible part. The rigid part is thus simple in structure and the connection between the rigid part and the flexible part is particularly strong in withstanding transverse forces.

In a second embodiment, the means for defining an additional connection surface comprise tongues extending substantially parallel to the longitudinal axis of the pipe element, the tongues being embedded in the end portion of the flexible part and reinforcing said flexible part in a radial direction. The tongues thus serve to increase the strength of the flexible part against the pressure of the fluid flowing in the circuit in which the pipe element is installed, while nevertheless conserving sufficient flexibility for the flexible part.

In a particular application, the pipe element forms a tubular junction element for joining a thermoplastic pipe to a nipple, the rigid part having a male portion provided with external ridges for insertion into the pipe and a shoulder secured to said end of the rigid part and presenting on its side opposite from the male portion a surface that forms the radial connection surface for connection to the end portion of the flexible part, the flexible part being constituted by a flexible sleeve for receiving the nipple via its end opposite from the rigid part. It is thus possible to limit the number of pieces needed for joining a pipe to a nipple, with this number being limited to a tubular junction element plus optionally a clamping collar enabling the nipple to be fixed in the flexible sleeve. The weight of the junction made in this way is likewise small. The length of the junction then corresponds to the length of the nipple plus the distance between the nipple and the rigid part of the tubular junction element. The junction is thus relatively short.

According to a particular characteristic, the flexible sleeve presents at least one mark in relief on its outside for positioning a clamping collar, which mark is constituted, for example, by a groove or an annular bead. The positioning mark enables the operator assembling the flexible sleeve on the nipple to place the clamping collar accurately on the portion of the sleeve that extends around the nipple.

BRIEF DESCRIPTION OF THE DRAWINGS

Other characteristics and advantages of the invention will appear on reading the following description of particular and non-limiting embodiments of the invention.

Reference is made to the accompanying drawings, in which:

FIG. 1 is a longitudinal half-section view of a pipe element forming a tubular junction element between a pipe and a nipple, and constituting a first embodiment of the invention;

FIG. 2 is a view analogous to FIG. 1 of a tubular junction element constituting a second embodiment;

FIG. 3 is a view analogous to FIG. 1 of a tubular junction element constituting a third embodiment;

FIG. 4 is an end view of the rigid part of the third embodiment of the tubular junction element;

FIG. 5 is a longitudinal section view of the rigid part of said third embodiment;

FIGS. 6 and 7 are cutaway elevation views of variant tubular junction elements in which the flexible sleeve is provided on the inside with a diaphragm;

FIG. 8 is a view analogous to FIG. 1 of a fourth embodiment of a pipe element in which the pipe element serves to interconnect two pipes of thermoplastic material; and FIGS. 9 and 10 are views analogous to FIG. 1 showing variants of one of the rigid parts of the fourth embodiment of the pipe element.

MORE DETAILED DESCRIPTION

With reference to FIGS. 1 to 3, each of the first three embodiments of a pipe element of the invention forms a tubular junction element given overall reference 1, and intended to enable a pipe C of thermoplastic material to be connected to a nipple T likewise of thermoplastic material and comprising, in conventional manner, a tubular cylindrical part T1 with a free end that is provided with an external rim T2. The pipe C and the nipple T are drawn in FIG. 1 using chain-dotted lines.

The tubular junction element 1 has a longitudinal axis 2 along which there extend in succession a rigid part 3 and a flexible sleeve 4 in alignment with the rigid part 3 and together forming a single piece.

The rigid part 3 is tubular and has a male portion 5 with external annular ridges 6 of the serrated tang type. The male portion is for insertion into the pipe C. The rigid part 3 is shown here as being straight, but it could naturally be curved.

Remote from its end whereby the male portion 5 is to be inserted into the pipe C, the opposite end 7 of the rigid part 3 forms a shoulder. Going away from the male portion 5, the shoulder 7 presents a radial surface 8 that co-operates closely with an end portion 11 of the flexible sleeve 4 to form a radial connection surface between the rigid part 3 and the flexible sleeve 4.

On the radial connection surface 8, the rigid part 3 also has means 9 for defining an additional surface 10 co-operating closely with the end portion 11 of the flexible sleeve 4 so as to form an additional connection surface. At least a part of the additional connection surface 10 extends parallel to the longitudinal axis 2.

The flexible sleeve 4 is designed to receive the nipple T via its end remote from its end portion 11 and the rigid part 3. The flexible sleeve 4 is shown in the figures as being straight, but it could naturally be curved.

In this case, the tubular junction element is made by a two-material injection method. The rigid part 3 is constituted, for example, by a polyamide modified for implementing the method, and the flexible sleeve is an elastomer such as a carboxyl nitrile rubber (XNBR) so as to achieve chemical bonding between the polyamide of the rigid part 3 and the elastomer of the flexible sleeve 4 via the radial connection surface 8 and the additional connection surface 10. Other manufacturing methods can be used to obtain a connection between the rigid part 3 and the end portion 11 via the connection surfaces 8 and 9, such as an injection method with prior application of an adhesion agent on the rigid part, for example. Other materials can also be used for the rigid part and the flexible sleeve, and in particular the flexible sleeve can be made of a fluorocarbon rubber (FPM) or a hydrogenated nitrile rubber (HNBR).

Various embodiments of the tubular junction element and more particularly of the means for defining the additional connection surface 10 are described below with reference to FIGS. 1 to 3. Elements that are identical or analogous to those described above are given identical reference numerals in the following description of these embodiments.

With reference to FIG. 1, the additional connection surface 10 is defined by a ring 9 projecting from the radial connection surface 8. The ring 9 has a central axis corresponding to the longitudinal axis 2 and in this case it extends 5 mm parallel to the central axis.

The ring 9 is embedded in the material constituting the end portion 11 of the flexible sleeve 4.

A groove 12 extends on the outside around the flexible sleeve 4. The groove 12 is made when injecting the flexible sleeve 4.

When the nipple T is inserted into the flexible sleeve 4, the free end T2 of the nipple T lies at a distance from the free edge of the ring 9 so that the junction retains a certain amount of flexibility. When the nipple T is positioned in this way, the groove 12 extends over the cylindrical portion T1 of the nipple.

A clamping collar S, drawn in chain-dotted lines in FIG. 1 in its position prior to fixing, is received in the groove 12 and is then ideally placed to secure the flexible sleeve 4 effectively to the nipple T.

With reference to FIG. 2, the means for defining the additional connection surface 10 are formed by a ring 9 whose central axis coincides with the longitudinal axis 2, which surface is partially embedded in the material forming the end portion 11 of the flexible sleeve 4 so that the additional connection surface 10 is formed by the outer surface of the ring 9.

The ring 9 has a free edge 13 forming an outside step projecting radially into the end portion 11. This step reinforces the connection between the rigid part 3 and the sleeve 4 by forming an obstacle that opposes the rigid part 3 being pulled off the sleeve 4. A mechanical connection is thus formed between the rigid part 3 and the flexible sleeve 4.

With reference to FIGS. 3 to 5, the additional connection surface 10 is formed by the surface envelope of tongues 9 extending parallel to the longitudinal axis 2 and embedded in the material constituting the end portion 11 of the flexible sleeve 4. The tongues reinforce the end portion 11 of the flexible sleeve 4 transversely. When the nipple T is received in the flexible sleeve 4, its rim T2 lies at a distance from the free ends of the tongues. The tongues thus increase the ability of the end portion 11 to withstand the pressure of the fluid flowing in the circuit in which the tubular junction element is inserted and enables it to adapt to the pressure and temperature properties of the fluid.

Four tongues 9 are shown disposed symmetrically at 90° from one another, it being understood that a different number of tongues and/or an asymmetrical disposition of the tongues could be envisaged to adapt the tubular junction element to particular strength or flexibility constraints. Outer steps could also be provided in the tongues 9 so as to project into the material of the end portion 11 so as to oppose the rigid part 3 being pulled off.

Two annular beads extend in parallel around the outside surface of the flexible sleeve 4 to form marks for positioning a clamping collar.

In a variant, and in particularly advantageous manner, the flexible sleeve 4 is provided internally with a diaphragm given reference 14 in FIGS. 6 and 7.

The diaphragm 14 extends transversely inside the flexible sleeve 4 and in this case it is formed integrally with the flexible sleeve during injection thereof. The diaphragm 14 is made of XNBR (or of some other rubber such as the two mentioned above) so as to be deformable between a rest state (shown in FIGS. 6 and 7) in which the diaphragm 14 closes the flexible sleeve 4, and a deformed state in which the diaphragm 14 defines an orifice.

In FIG. 6, the diaphragm 14 extends adjacent to the rigid part 3 so that once the junction element 1 is connected to the circuit, the diaphragm is put into its deformed state by the fluid flowing in the sleeve 4 in direction E and returns to its rest state as soon as the fluid flows in the opposite direction, with the diaphragm then closing the flexible sleeve so as to form a check valve.

In FIG. 7, the diaphragm 14 extends across the flexible sleeve 4 at its end remote from the rigid part 3 so that when the nipple T is inserted into the flexible sleeve 4 the nipple deforms the diaphragm 14 and opens out into the duct of the sleeve, and this deformation can go beyond the elastic limit of the diaphragm 14.

The diaphragm acts as a capsule on the sleeve to prevent particles penetrating into the pipe before it is connected to the nipple. This function is particularly advantageous when the tubular junction element 1 is for use in the fuel feed circuit of a vehicle, since any such particles run the risk of blocking the injectors of the fuel circuit. Instead of a diaphragm, it is possible to provide a simple tearable membrane.

The sleeve 4 can also present internal relief forming a step, preferably formed integrally with the sleeve, so as to constitute an obstacle opposing the sleeve being pulled off the nipple. The sleeve 4 can also have an inside annular lip acting as a lip gasket and improving sealing of the junction.

With reference to FIGS. 8 to 10, the fourth embodiment of the pipe element, given overall reference 1, is designed to enable two pipes of thermoplastic material to be connected together (pipes C in FIG. 8, C and C' in FIG. 9, C and C" in FIG. 10).

As in the preceding embodiments, the pipe element 1 has a longitudinal axis 2, a rigid part 3 with a male portion 5 and a shoulder 7 presenting a radial connection surface 8 for connection to an end portion 11 of a flexible part formed by a sleeve 4, and means 9, in this case a ring, defining an additional connection surface 10 having a part extending parallel to the longitudinal axis 2.

In this fourth embodiment, the pipe element 1 has a second rigid part secured to a second end portion 11 of the sleeve 4 at its end opposite to the above-mentioned first end portion 11.

In this case, the second rigid part is made as a single piece with the sleeve 4 and the first rigid part 3 using the method described above.

In FIG. 8, the second rigid part is referenced 3 and is identical to that described above.

In FIG. 9, the second rigid part is referenced 3' and has a circular groove 16' formed in an end face 15' of the rigid part 3' and centered on the longitudinal axis 2. The transverse dimensions of the groove 16' correspond to those of the pipe C' so that the pipe C' can be received in the groove 16' and can be spin-welded thereto. Other shapes suitable for spin-welding could be used.

The rigid part 3' has an end 7' opposite from its end face 15' and presenting a radial connection surface 8' for connection to the corresponding end portion 11 of the sleeve 4.

A coaxial ring 9' extends from the radial connection surface 8'. The ring 9' is embedded in the corresponding end portion 11 of the sleeve 4 and defines an additional connection surface 10' for connection to the corresponding end portion 11. A part of the additional connection surface 10' extends parallel to the longitudinal axis 2.

In FIG. 10, the second rigid part carries the reference 3" and has snap-fastening means of conventional type for co-operating with a ridge on the pipe C".

The rigid part 3" has an end 7" presenting a radial surface 8" for connection to the corresponding end portion 11 of the sleeve 4.

A ring 9" extends from the radial surface 8" parallel to the longitudinal axis 2. The ring 9" is embedded in the corresponding end portion 11 and defines an additional connection surface 10" which has a part that extends parallel to the longitudinal axis 2.

Naturally, the invention is not limited to the embodiments described and variant embodiments can be devised without going beyond the ambit of the invention as defined by the claims.

What is claimed is:

1. A pipe element possessing a longitudinal axis (2) along which there extend in succession at least a flexible tubular part (4) and a rigid tubular part (3), wherein the rigid part (3) and the flexible part (4) constitute a single piece, the rigid part having an end (7) presenting a substantially radial connection surface (8) for connection with an end portion (11) of the flexible part (4), and wherein the rigid part (3) has means (9) on the radial connection surface (8) for defining an additional connection surface (10) that is at least substantially parallel to the longitudinal axis (2) and for connection to the end portion (11) of the flexible part (4), said means comprising tongues (9) extending substantially parallel to the longitudinal axis (2) of the pipe element (1), the tongues being embedded in the end portion (11) of the flexible part (4) and reinforcing said flexible part in a radial direction.

2. A pipe element according to claim 1, forming a tubular junction element for joining a thermoplastic pipe to a nipple, the rigid part (3) having a male portion (5) provided with external ridges (6) for insertion into the pipe and a shoulder secured to said end (7) of the rigid part (3) and presenting on its side opposite from the male portion (5) a surface that forms the radial connection surface (8) for connection to the end portion (11) of the flexible part, the flexible part being constituted by a flexible sleeve (4) for receiving the nipple via its end opposite from said end portion (11).

3. A pipe element according to claim 2, wherein the flexible sleeve (4) presents at least one mark (12) in relief on its outside for positioning a clamping collar.

4. A pipe element according to claim 3, wherein the mark is a groove (12).

5. A pipe element according to claim 3, wherein the mark is an annular bead (12).

6. A pipe element according to claim 1 including a diaphragm (14) extending across the inside of the flexible part (4), the diaphragm being deformable between a rest state in which it closes the flexible part and a deformed state in which it defines an opening.

7. A pipe element according to claim 6, wherein the diaphragm (14) is adjacent to the rigid part (3) and is arranged to be moved into its deformed state by a fluid flowing in the pipe element in a determined direction (E), and into its rest state when the fluid flows in the opposite direction.

8. A pipe element according to claim 7, wherein the diaphragm (14) extends remote from the rigid part (3) so as to be moved into its deformed state by a nipple when the nipple is inserted into the flexible part.

* * * * *